(12) United States Patent
Masuda et al.

(10) Patent No.: US 11,158,460 B2
(45) Date of Patent: Oct. 26, 2021

(54) CERAMIC ELECTRONIC COMPONENT WITH LEAD TERMINALS HAVING A COATING LAYER

(71) Applicant: TDK CORPORATION, Tokyo (JP)

(72) Inventors: Akihiro Masuda, Tokyo (JP); Norihisa Ando, Tokyo (JP); Shinya Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/006,100

(22) Filed: Aug. 28, 2020

(65) Prior Publication Data

US 2021/0090805 A1 Mar. 25, 2021

(30) Foreign Application Priority Data

Sep. 19, 2019 (JP) .............................. JP2019-170387

(51) Int. Cl.
*H01G 4/232* (2006.01)
*H01G 4/236* (2006.01)
*H01G 4/224* (2006.01)

(52) U.S. Cl.
CPC ........... *H01G 4/2325* (2013.01); *H01G 4/224* (2013.01); *H01G 4/236* (2013.01)

(58) Field of Classification Search
None
See application file for complete search history.

(56) References Cited

U.S. PATENT DOCUMENTS

| 2,374,499 | A | * | 4/1945 | Quayle | H01G 4/28 361/321.6 |
| 2,673,972 | A | * | 3/1954 | Minnium | H01G 4/28 361/308.3 |
| 4,168,520 | A | * | 9/1979 | Coleman | H01G 2/06 29/25.42 |
| 4,242,717 | A | * | 12/1980 | Saban | H01G 4/228 174/551 |
| 4,255,779 | A | * | 3/1981 | Meal | H05K 3/308 174/549 |
| 4,347,551 | A | * | 8/1982 | Tanaka | H01G 4/228 29/25.42 |
| 4,446,502 | A | * | 5/1984 | Boser | H01G 4/2325 361/308.2 |

(Continued)

FOREIGN PATENT DOCUMENTS

JP S62-074322 U 5/1987

OTHER PUBLICATIONS

Advanced_Ceramic_Component. Ayode. (Year: 2020).*

*Primary Examiner* — Timothy J. Dole
*Assistant Examiner* — Muhammed Azam
(74) *Attorney, Agent, or Firm* — Oliff PLC

(57) ABSTRACT

A ceramic electronic component of the present invention includes: a ceramic element body; a terminal electrode formed on from an end surface to a side surface of the ceramic element body; and a lead terminal joined to the terminal electrode by a solder. A fillet of the solder is formed between the terminal electrode of a side surface at the ceramic element body and the lead terminal, and a coating layer is formed on a surface of the lead terminal that is in contact with the solder. The coating layer is formed of a metal component having a contact angle with the solder smaller than that of the lead terminal.

10 Claims, 6 Drawing Sheets

(56) References Cited

U.S. PATENT DOCUMENTS

| | | | | |
|---|---|---|---|---|
| 4,458,294 A * | 7/1984 | Womack | H01G 4/2325 | 361/321.3 |
| 4,603,373 A * | 7/1986 | Lavene | H01G 4/32 | 361/306.1 |
| 4,764,844 A * | 8/1988 | Kato | H01G 4/228 | 361/308.2 |
| 4,806,159 A * | 2/1989 | De Keyser | C25D 5/54 | 106/1.11 |
| 4,959,652 A * | 9/1990 | Hirama | H01G 2/065 | 29/25.42 |
| 5,142,436 A * | 8/1992 | Lee | H01G 4/224 | 361/302 |
| 5,963,416 A * | 10/1999 | Honda | H01F 41/046 | 361/306.1 |
| 5,978,203 A * | 11/1999 | Kiyomura | H01G 9/12 | 361/301.3 |
| 6,451,074 B2 * | 9/2002 | Bluvstein | H01G 9/025 | 29/25.03 |
| 6,903,920 B1 * | 6/2005 | Prymak | H01G 4/248 | 361/321.2 |
| 9,524,826 B2 * | 12/2016 | Choi | H01G 4/012 | |
| 9,685,272 B2 * | 6/2017 | Ahn | H01G 4/30 | |
| 9,865,397 B2 * | 1/2018 | Tanaka | H01G 4/232 | |
| 9,870,866 B2 * | 1/2018 | Noda | H01G 4/30 | |
| 10,395,840 B1 * | 8/2019 | Park | H01G 4/224 | |
| 10,593,479 B2 * | 3/2020 | Sasaki | H01G 4/248 | |
| 10,622,150 B2 * | 4/2020 | Onodera | H01G 4/30 | |
| 10,650,971 B2 * | 5/2020 | Jung | H01G 4/12 | |
| 10,825,611 B1 * | 11/2020 | Fukuoka | H01G 4/248 | |
| 10,937,596 B2 * | 3/2021 | Onodera | H01G 4/248 | |
| 2003/0037962 A1 * | 2/2003 | Kayatani | H01C 1/144 | 174/261 |
| 2003/0103316 A1 * | 6/2003 | Schabbach | H01G 4/224 | 361/301.1 |
| 2004/0084131 A1 * | 5/2004 | Konoue | B32B 18/00 | 156/89.11 |
| 2005/0007718 A1 * | 1/2005 | Stevenson | H01G 4/236 | 361/118 |
| 2007/0045814 A1 * | 3/2007 | Yamamoto | H01L 23/49822 | 257/698 |
| 2008/0063877 A1 * | 3/2008 | Ukuma | H01G 4/2325 | 428/433 |
| 2008/0128860 A1 * | 6/2008 | Sawada | H01G 4/30 | 257/536 |
| 2008/0239621 A1 * | 10/2008 | Tajuddin | H01G 4/232 | 361/306.1 |
| 2010/0290172 A1 * | 11/2010 | Motoki | H01G 4/2325 | 361/305 |
| 2012/0026659 A1 * | 2/2012 | Kim | G01K 1/08 | 361/679.01 |
| 2013/0020913 A1 * | 1/2013 | Shirakawa | H01G 4/232 | 310/364 |
| 2013/0182369 A1 * | 7/2013 | Jeon | H01G 4/2325 | 361/301.4 |
| 2013/0250472 A1 * | 9/2013 | Lee | H01G 4/012 | 361/301.4 |
| 2013/0250480 A1 * | 9/2013 | Ahn | H01G 4/2325 | 361/321.2 |
| 2014/0116766 A1 * | 5/2014 | Jeon | H01G 4/232 | 174/260 |
| 2014/0118882 A1 * | 5/2014 | Masuda | H01G 4/2325 | 361/321.2 |
| 2014/0198427 A1 * | 7/2014 | Kamobe | H01G 4/30 | 361/301.4 |
| 2015/0213959 A1 * | 7/2015 | Omori | H01G 4/1227 | 361/301.4 |
| 2016/0351332 A1 * | 12/2016 | Lee | H01G 4/30 | |
| 2018/0019061 A1 * | 1/2018 | Yamaguchi | H01G 4/012 | |
| 2018/0114643 A1 * | 4/2018 | Okouchi | C08L 23/18 | |
| 2018/0137979 A1 * | 5/2018 | Kim | H01G 2/06 | |
| 2018/0182553 A1 * | 6/2018 | Yazawa | H01G 4/30 | |
| 2018/0286584 A1 * | 10/2018 | Ando | H01G 4/1227 | |
| 2018/0330883 A1 * | 11/2018 | Sano | H01L 28/60 | |
| 2018/0374640 A1 * | 12/2018 | Akiyoshi | H01G 4/12 | |
| 2018/0374641 A1 * | 12/2018 | Akiyoshi | H01G 4/232 | |
| 2019/0080845 A1 * | 3/2019 | Onodera | H05K 1/0271 | |
| 2019/0096576 A1 * | 3/2019 | Onodera | H01G 4/005 | |
| 2019/0131072 A1 * | 5/2019 | Onodera | H01G 4/2325 | |
| 2019/0131076 A1 * | 5/2019 | Fukumura | H01G 2/065 | |
| 2019/0237250 A1 * | 8/2019 | Onodera | H01G 4/30 | |
| 2019/0237259 A1 * | 8/2019 | Onodera | H01G 4/30 | |
| 2019/0237261 A1 * | 8/2019 | Onodera | H01G 2/06 | |
| 2019/0304683 A1 * | 10/2019 | Terashita | H01G 2/065 | |
| 2019/0362895 A1 * | 11/2019 | Kobayashi | H01G 4/2325 | |
| 2020/0082986 A1 * | 3/2020 | Yaso | H01F 41/04 | |
| 2020/0118754 A1 * | 4/2020 | Seo | H01G 4/12 | |
| 2020/0161052 A1 * | 5/2020 | Cha | H01G 4/248 | |
| 2020/0203073 A1 * | 6/2020 | Asano | H01G 4/30 | |
| 2020/0211774 A1 * | 7/2020 | Onodera | H01G 4/30 | |
| 2020/0234883 A1 * | 7/2020 | Muramatsu | H01G 4/1236 | |
| 2020/0312551 A1 * | 10/2020 | Nagai | H01G 4/2325 | |
| 2020/0312563 A1 * | 10/2020 | Nagai | H01G 4/2325 | |
| 2020/0388439 A1 * | 12/2020 | Togawa | H01G 4/2325 | |
| 2020/0402714 A1 * | 12/2020 | Yoon | H01G 2/22 | |
| 2020/0402715 A1 * | 12/2020 | Yoon | H01G 2/22 | |
| 2021/0027945 A1 * | 1/2021 | Takahashi | H01G 4/2325 | |
| 2021/0090805 A1 * | 3/2021 | Masuda | H01G 4/2325 | |

* cited by examiner

CERAMIC ELECTRONIC COMPONENT WITH LEAD TERMINALS HAVING A COATING LAYER

BACKGROUND OF THE INVENTION

Field of the Invention

The present invention relates to a ceramic electronic component having a lead terminal.

Background of the Invention

As an electronic component mounted on a circuit board, a ceramic electronic component having a lead terminal as shown in Patent Document 1 has been known. In this ceramic electronic component, it is common to use a solder to join the lead terminal to a ceramic element body on which a terminal electrode is formed.

When the lead terminal is joined by the solder, a fillet is formed between the lead terminal and the terminal electrode due to wet-spread of the solder. At an end portion of the ceramic element body that is in contact with the fillet, cracks are likely to occur inside the element body due to generation of a shrinkage stress during solidification of the solder, or the like.

[Patent Document 1] JP Patent Application Laid Open No. S62 074322U

SUMMARY OF THE INVENTION

The present invention was attained in view of above situation, and an object of the present invention is to provide a ceramic electronic component that reduces cracks generated in a ceramic element body and has a sufficient mechanical strength.

In order to attain the above object, a ceramic electronic component according to the present invention includes:
a ceramic element body;
a terminal electrode formed on from an end surface to a side surface of the ceramic element body; and
a lead terminal joined to the terminal electrode by a solder, wherein
a fillet of the solder is formed between the terminal electrode of a side surface at the ceramic element body and the lead terminal,
a coating layer is formed on a surface of the lead terminal that is in contact with the solder, and
the coating layer is formed of a metal component having a contact angle of the solder smaller than that with the lead terminal.

In the ceramic electronic component of the present invention, the fillet is formed between the terminal electrode of the side surface at the ceramic element body and the lead terminal, and joining areas of the solder are present on both the end surface side and side surface side of the terminal electrode. Therefore, in the ceramic electronic component of the present invention, the lead terminal is firmly connected to the terminal electrode of the ceramic element body. Particularly, in the ceramic electronic component of the present invention, a sufficient joining strength can be ensured even when the size of the ceramic element body is small.

In addition, in the ceramic electronic component of the present invention, the sufficient joining strength can be ensured, and at the same time, the occurrence of cracks can be suppressed.

It has been known in the prior art that in order to suppress the formation of a fillet, a part of a lead terminal is subjected to a solder adhesion preventing treatment to partially deteriorate the solder wettability on the surface of the lead terminal. Contrary to the prior art, in the ceramic electronic component of the present invention, the portion of the lead terminal that is in contact with the solder is optimized to improve the solder wettability of the surface. In the present invention, it has been found that an angle of the solder fillet with respect to the side surface of the ceramic element body is rather reduced by improving the solder wettability on the lead terminal side as described above. Since the angle of the fillet is reduced, the occurrence of the cracks in the ceramic element body can be suppressed. Moreover, since the cracks are suppressed, a mechanical strength of the ceramic electronic component is improved.

In the ceramic electronic component of the present invention, the lead terminal preferably contains copper. Moreover, the metal component forming the coating layer preferably contains copper and tin. It is particularly preferable that a boundary between the lead terminal and the solder has a joining structure formed in an order of copper of the lead terminal, the coating layer containing a copper-tin alloy, and the solder from the lead terminal side. By adopting the above-described joining structure in the ceramic electronic component of the present invention, the solder wettability on the lead terminal side is further optimized, and the angle of the fillet can be further reduced. As a result, the cracks generated in the ceramic element body can be suppressed more preferably.

In the ceramic electronic component of the present invention, the coating layer more preferably contains $Cu_6Sn_5$. Since the coating layer contains $Cu_6Sn_5$ as described above, the solder wettability is further improved, and the angle of the fillet is reduced. Moreover, since $Cu_6Sn_5$ has a higher melting point than tin, heat resistance is improved at the joining portion between the lead terminal and the solder.

In addition, it is preferable that the coating layer is not a copper-tin plating layer formed by plating, but an alloy layer formed by immersing only a tip end portion of the lead terminal in a solder bath. As described above, in the ceramic electronic component according to the present invention, since the coating layer has the alloy layer formed by an immersing treatment, the mechanical strength is improved as compared with the copper-tin plating layer formed by a plating treatment.

In addition, in the present invention, an angle of the fillet with respect to the side surface of the ceramic element body is preferably 15 degrees or more and less than 40 degrees, and more preferably less than 35 degrees. By setting the angle of the fillet with respect to the side surface of the ceramic element body within the above-mentioned range, the cracks generated in the ceramic element body can be suppressed more preferably.

Furthermore, a thickness of the coating layer is preferably 1 μm or more and 7 μm or less. By setting the thickness of the coating layer within the above-mentioned range, an underlayer can be sufficiently covered with the coating layer, and the solder wettability on the lead terminal side is further optimized. As a result, the cracks generated in the ceramic element body can be suppressed more preferably.

In the present invention, a ratio of L1 to T0 (L1/T0) is preferably 1.5 times to 2.0 times, where T0 is a height in a first direction (Z-axis direction) of the ceramic element body, and L1 is a length in the first direction of the lead terminal on which the coating layer is formed. Moreover, it is preferable that a tin plating layer is formed on a surface of the lead terminal on which the coating layer is not formed.

As described above, by forming different coating layers on the tip end side of the lead terminal (terminal electrode facing portion side) and a board mounting side, joining reliability on the terminal electrode facing portion side can be ensured, and joining reliability on the board mounting side can also be ensured.

The ceramic electronic component according to the present invention can be manufactured, for example, by a manufacturing method described below. That is, a method for manufacturing a ceramic electronic component according to the present invention includes:

a step of preparing a ceramic element body having a surface formed with a terminal electrode;

an immersing step of immersing a tip end portion of a lead terminal in a solder bath;

a step of temporarily fixing the ceramic element body to the tip end portion of the lead terminal after the immersing step; and a soldering step of immersing the tip end portion of the lead terminal, to which the ceramic element body is temporarily fixed, in a solder bath to solder the terminal electrode of the ceramic element body and the tip end portion of the lead terminal.

As described above, in the method for manufacturing a ceramic electronic component according to the present invention, first, only the lead terminal is immersed in the solder bath, and then the lead terminal and the terminal electrode of the ceramic element body are soldered. With such a double immersing step, a coating layer having good solder wettability is formed at the tip end portion (at least a portion in contact with the solder) of the lead terminal. As a result, it is possible to obtain a ceramic electronic component in which cracks generated in the ceramic element body are reduced.

The thickness and compositions of the coating layer formed on the lead terminal can be controlled by a temperature of the solder bath, or immersing time in the immersing step, or the like. More specifically, the temperature of the solder bath in the immersing step is preferably about 0.9 to 1.1 times a temperature of the solder bath in the soldering step.

In addition, it is preferable to set the immersing time in the solder bath in the immersing step longer than that in the soldering step. More specifically, it is preferable to set the immersing time in the immersing step to a long time of about 10 to 60 times the immersing time in the soldering step.

The conditions of the immersing step and the soldering step are controlled as described above, so that a coating layer having the optimum solder wettability is formed at the tip end portion of the lead terminal.

DETAILED DESCRIPTION OF THE PREFERRED EMBODIMENTS

Hereinafter, the present invention is described based on embodiments shown in drawings, but the present invention is not limited to the following embodiments.

Figure 1:
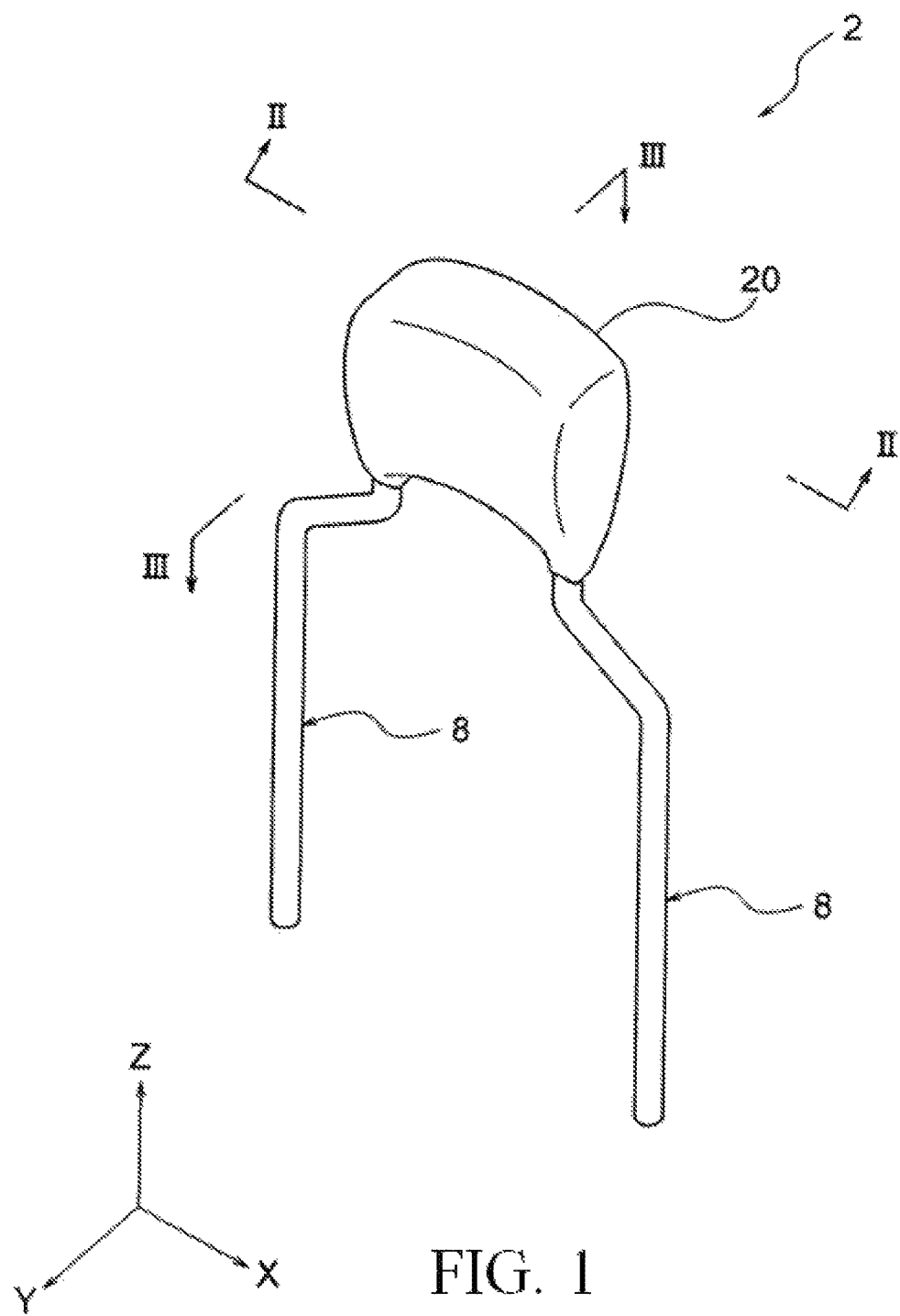
FIG. 1 is a schematic perspective view of a ceramic electronic component having lead terminals according to an embodiment of the present invention.
Figure 2:
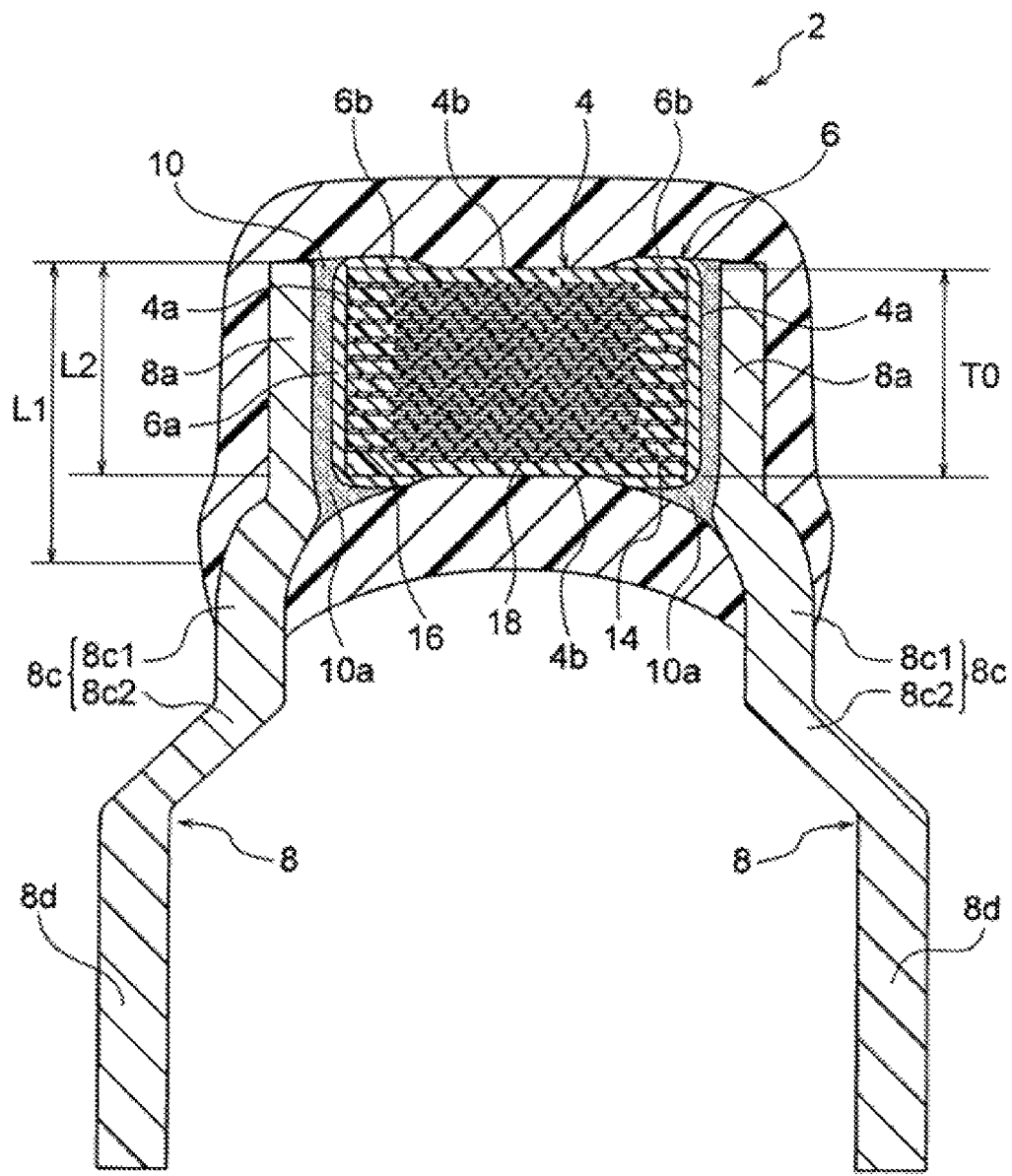
FIG. 2 is a cross-sectional view of essential parts taken along a line II-II shown in FIG. 1.

As shown in FIGS. 1 and 2, a ceramic electronic component 2 having lead terminals according to an embodiment of the present invention includes a ceramic element body 4, a pair of lead terminals 8, and an exterior 20. In the present embodiment, as an example of the ceramic electronic component, a ceramic electronic component in which the ceramic element body 4 is configured with a laminated ceramic capacitor is described.

As shown in FIG. 2, the exterior 20 covers the entire ceramic element body 4 and a part of each lead terminal 8. The covering range of the exterior 20 is not particularly limited, as long as the exterior 20 at least covers the entire ceramic element body 4 and a joining portion between the ceramic element body 4 and each lead terminal 8 (that is, a portion where a solder 10 described later is present). A material of the exterior 20 is not particularly limited, as long as the material has an insulating property. For example, the material of the exterior 20 is preferably a halogen-free insulating resin, and examples of the halogen-free insulating resin include a thermosetting resin such as an epoxy resin.

The ceramic element body 4 shown in FIG. 2 includes two end surfaces 4a facing each other in an X-axis direction and four side surfaces 4b connecting the two end surfaces 4a, and has a rectangular parallelepiped shape as a whole. However, a shape and dimensions of the ceramic element body 4 are not particularly limited, as long as being appropriately determined according to a purpose and application of the laminated ceramic capacitor. For example, regarding the dimensions of the ceramic element body 4, a length in the X-axis direction may be 0.6 to 6.5 mm, a width (W0 shown in FIG. 3) may be 0.3 to 5.0 mm, and a height (T0 shown in FIG. 2) may be 0.2 to 3.5 mm. In each drawing, an X axis, a Y axis, and a Z axis (first direction) are perpendicular to each other.

Figure 3:
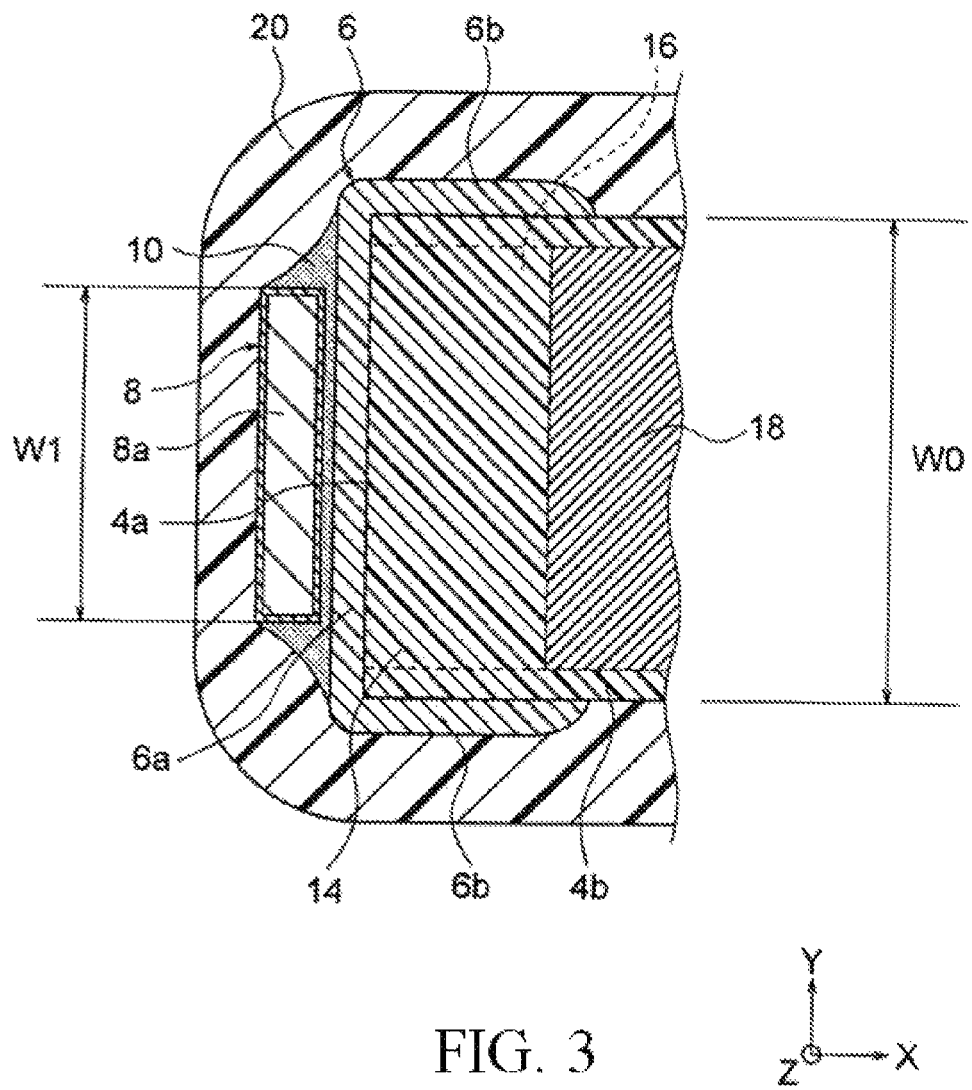
FIG. 3 is a cross-sectional view of essential parts taken along a line III-III shown in FIG. 1.

As shown in FIGS. 2 and 3, internal electrode layers 16 and 18 are alternately laminated inside the ceramic element body 4 via ceramic layers 14. The internal electrode layers 16 are exposed on one end surface 4a of the ceramic element body 4 in the X-axis direction, and the internal electrode layers 18 are exposed on the other end surface 4a of the ceramic element body 4.

In addition, a pair of terminal electrodes 6 are formed on both ends of the ceramic element body 4 in the X-axis direction. More specifically, each terminal electrode 6 is formed so as to wrap around from respective end surfaces 4a to respective side surfaces 4b of the ceramic element body 4, and includes an end surface side electrode 6a and a side surface side electrode 6b. The internal electrodes 16 and 18 are electrically connected to the end face side electrodes 6a on the exposed end surfaces 4a, respectively. The pair of terminal electrodes 6 are insulated from each other, and the pair of terminal electrodes 6 and the internal electrode layers 16 and 18 form a capacitor circuit.

In the present embodiment, each ceramic layer 14 is formed of a dielectric composition. The dielectric composition to be used is not particularly limited, and a known material may be used. For example, barium titanate (BaTiO$_3$), calcium titanate (CaTiO$_3$), strontium titanate (SrTiO$_3$), calcium zirconate (CaZrO$_3$), potassium niobate (KNbO$_3$), or the like may be used as main components. In addition to these main components, rare earth oxides, alkaline earth metal oxides, transition metal oxides, magnesium oxide, or the like may be added as subcomponents. A thickness and the number of laminated layers of the ceramic layers 14 are not particularly limited, and may be a general thickness and a general number of laminated layers.

Each of the internal electrode layers 16 and 18 contains a conductive metal as the main component. The conductive metal to be used is not particularly limited, and a known material may be used. Examples thereof include nickel, copper, silver, gold, palladium, or an alloy containing at least one of these metals. A thickness of each of the internal electrode layers 16 and 18 is not particularly limited, and a general thickness may be adopted. Moreover, the number of laminated layers of each of the internal electrode layers 16 and 18 is determined according to the number of laminated layers of the ceramic layers 14.

In addition, a material of each terminal electrode 6 is not particularly limited, as long as the material contains a conductive metal as a main component. Regarding the terminal electrodes 6, copper, a copper alloy, nickel, a nickel alloy, or the like is usually used, but silver, an alloy of silver and palladium, or the like may also be used. A thickness of each terminal electrode 6 is also not particularly limited and is usually about 10 to 50 µm. A surface of each terminal electrode 6 may be formed with a plating layer of at least one selected from nickel, copper, tin, or the like. In each terminal electrode 6, a thickness of each plating layer is preferably 1 to 10 µm, and the plating layer may be a multi-layer structure.

In the present embodiment, as shown in FIG. 2, the pair of lead terminals 8 are provided corresponding to the two end surfaces 4a of the ceramic element body 4. Each lead terminal 8 has a terminal electrode facing portion 8a, a bent portion 8c, and a lead leg portion 8d. In the present embodiment, the portions 8a to 8d of the lead terminals 8 are integrally formed by processing a conductive wire 80. However, the lead terminals 8 may also be formed by processing a conductive metal plate.

As the conductive wire 80 that constitutes the lead terminals 8, a metal wire containing copper (Cu), nickel (Ni), iron (Fe), silver (Ag), or the like may be used. It is particularly preferable that the lead terminals 8 contain copper. More specifically, it is preferable to use a copper-based metal wire (hereinafter, referred to as a Cu wire) in which a core material is pure copper or which is a copper alloy containing copper as a main component. Alternatively, it is preferable to use a copper-clad steel wire that has a surface formed with a copper plating layer (hereinafter referred to as a CP wire). In the case of the CP wire, a core material is pure iron or an iron alloy containing iron as a main component. When using the CP wire, a thickness of the copper plating layer formed on the surface of the core material is preferably 5 µm to 10 µm.

A wire diameter of the conductive wire 80 that constitutes the lead terminal 8 is appropriately determined according to dimensions of the ceramic element body 4. For example, the wire diameter may be 0.5 mm to 1.0 mm, and preferably 0.5 mm to 0.6 mm.

As shown in FIG. 2, the terminal electrode facing portion 8a of each lead terminal 8 is arranged so as to face the end surface side electrode 6a of each terminal electrode 6, and is joined to the end surface side electrode 6a via the solder 10. That is, the terminal electrode facing portion 8a is connected to the terminal electrode 6 such that a longitudinal direction of the lead terminal 8 is substantially parallel to the Z axis. In the present embodiment, the terminal electrode facing portion 8a is formed by squeezing a tip end of the above-mentioned conductive wire 80. Therefore, the terminal electrode facing portion 8a has a flat plate-shaped cross-sectional shape, as shown in FIG. 3.

A length L2 in a longitudinal direction (Z-axis direction) of the terminal electrode facing portion 8a may be longer or shorter than a height T0 of the ceramic element body 4 in the Z-axis direction. However, the length L2 of the terminal electrode facing portion 8a is preferably within a range of about 0.9 to 1.1 times the height T0 of the ceramic element body 4. With such a length, the joining strength between the terminal electrode 6 and the lead terminal 8 tends to be improved.

A width W1 in a Y-axis direction of the terminal electrode facing portion 8a shown in FIG. 3 is preferably within a range of about 0.7 to 1.1 times a width W0 in the Y-axis direction of the ceramic element body. By setting the width W1 of the terminal electrode facing portion 8a within the above-mentioned range, the amount of the interposed solder 10 that enters between the end surface side electrode 6a and the terminal electrode facing portion 8a can be controlled within an appropriate range.

Below the terminal electrode facing portion 8a in the Z-axis direction, the bent portion 8c, which is not linear with respect to the longitudinal direction of the lead terminal 8, is formed. A cross section of the bent portion 8c and a cross section of the lead leg portion 8d described later have circular shapes, unlike the terminal electrode facing portion 8a.

As shown in FIG. 2, in an X-Z cross section, each bent portion 8c is preferably formed by being bent in a direction in which the pair of lead terminals 8 are separated on the X axis. The bent portion 8c has such a bent shape and connects the terminal electrode facing portion 8a and the lead leg portion 8d. The bent shape of the bent portion 8c in the X-Z cross section is not limited to the shape shown in FIG. 2. For example, contrary to FIG. 2, the bent portion 8c may be bent in a direction in which the pair of lead terminals 8 approach each other on the X axis, or may have an S-shaped curved shape.

As shown in FIG. 2, the lead leg portion 8d is integrally formed on a lower end side of the bent portion 8c in the Z-axis direction, and extends straight downward in the Z-axis parallel to the end surface 4a of the ceramic element body 4. An end portion of the lead leg portion 8d is connected to a board such as a printed board or a flexible board to form a board mounting portion. A method for mounting the ceramic electronic component 2 on the board is not particularly limited, and for example, a mounting technique such as soldering, welding, or caulking may be applied. A lower side 8c2 of the bent portion 8c acts as a kink that regulates a standing height when mounting the ceramic electronic component 2 on the board.

Figure 4:
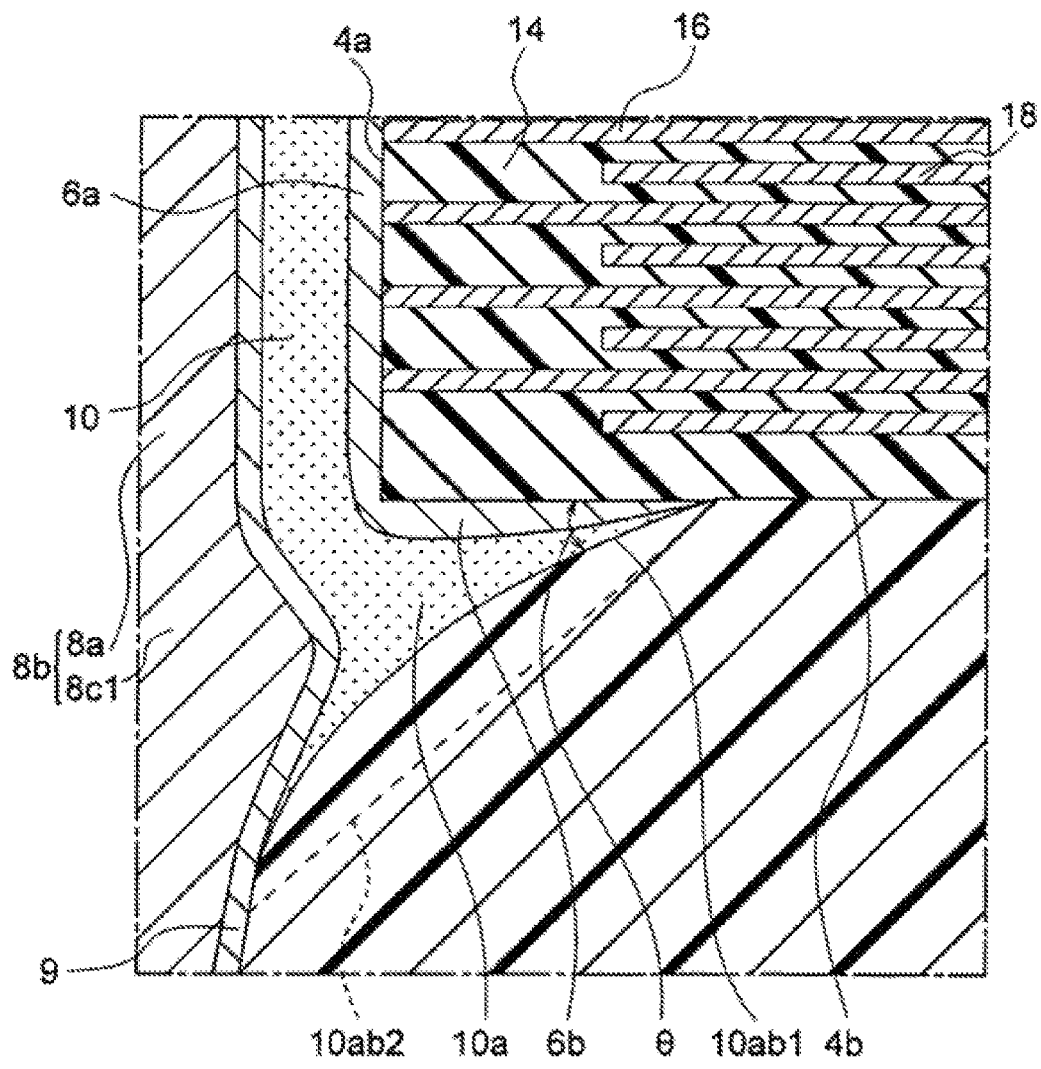
FIG. 4 is an enlarged cross-sectional view of essential parts in FIG. 2.

As described above, the lead terminal 8 is joined to the terminal electrode 6 by the solder 10. A material of the solders 10 is not particularly limited, and for example, a tin-antimony-based, tin-silver-copper-based, tin-copper-based, or tin-bismuth-based lead-free solder may be used. As shown in FIG. 4, the ceramic electronic component 2 according to the present embodiment is characterized by a joining structure between the terminal electrode 6 and the lead terminal 8. Hereinafter, the joining structure is described in detail.

As shown in FIG. 4, in the present embodiment, the solder 10 is interposed between the end surface side electrode 6a and the terminal electrode facing portion 8a and between the side surface side electrode 6b and an upper side 8c1 of the bent portion 8c. A fillet 10a of the solder 10 is formed between the side surface side electrode 6b and the upper side 8c1 of the bent portion 8c (that is, between the side surface 4b of the ceramic element body 4 and the lead terminal 8). That is, the lead terminal 8 is in contact with the solder 10 at the terminal electrode facing portion 8a and the upper side 8c1 of the bent portion 8c, and the terminal electrode facing portion 8a and the upper side 8c1 of the bent portion 8c constitute an element joining portion 8b.

In the present embodiment, after soldering, a coating layer 9 is formed on a surface of the element joining portion 8b of the lead terminal 8, that is, at a boundary between the element joining portion 8b and the solder 10. The coating layer 9 is formed of a metal component having a smaller contact angle with the solder 10 than that of the lead terminal 8. As described above, since the lead terminal 8 preferably contains copper, the coating layer 9 is preferably formed of a metal component having a smaller contact angle with the solder 10 than that of copper.

The contact angle with the solder 10 is an index for evaluating the solder wettability of the object to be joined, and means an angle formed by an outer edge portion of a droplet (wetting tip end portion) and a surface of the object to be joined when a liquefied solder is dropped on the object to be joined. The contact angle with the solder 10 mainly depends on a material of the solder 10 to be used and a composition of the coating layer 9 formed on the surface of the element joining portion 8b of the lead terminal 8.

Specific examples of the metal component having a smaller contact angle with the solder 10 than that of copper include silver, gold, palladium, copper-tin alloy, and the like, and copper-tin alloy is particularly preferable. That is, at the joining portion between the terminal electrode 6 and the lead terminal 8 shown in FIG. 4, the boundary between the lead terminal 8 and the solder 10 is formed in an order of copper of the lead terminal 8, the coating layer 9 containing copper and tin, and the solder 10 along the X-axis direction, and in the present embodiment, it is preferable to adopt such a joining structure.

The coating layer 9 containing the above-mentioned metal components may be formed, for example, by plating a surface of the lead terminal 8, but is particularly preferably formed by immersing only an tip end portion of the lead terminal 8 (that is, an area corresponding to the element joining portion 8b) in a solder bath (hereinafter referred to as an immersing step). In the present embodiment, the coating layer 9 formed by the immersing step is described.

The coating layer 9 formed by the immersing step is an alloy layer containing copper and tin. More specifically, the above-mentioned alloy layer may include $Cu_3Sn$ and $Cu_6Sn_5$ which are intermetallic compounds. It is particularly preferable that $Cu_6Sn_5$ is contained. Regarding the coating layer 9 formed via the immersing step, in the joining structure shown in FIG. 4, it is considered that a large amount of $Cu_3Sn$ is present on the lead terminal 8 side of the coating layer 9 and a large amount of $Cu_6Sn_5$ is present on the solder 10 side of the coating layer 9. That is, it is preferable that $Cu_6Sn_5$ is exposed on an outermost surface of the coating layer 9 that is in contact with the solder 10.

A thickness of the coating layer 9 formed by the immersing step may vary to some extent, but may be about 0.5 μm to 10 μm, preferably 1.0 μm to 7.0 μm, and more preferably 1.0 μm to 3.0 μm.

In the present embodiment, the coating layer 9 formed via the immersing step is formed on a surface of the element joining portion 8b of the lead terminal 8 (that is, the terminal electrode facing portion 8a and the upper side 8c1 of the bent portion 8c). A length in the Z-axis direction of a portion in which each coating layer 9 is formed, that is, a length in the Z-axis direction of each element joining portion 8b is indicated by reference numeral L1 in FIG. 2. L1 may be a length of about 1.1 times to 2.5 times, preferably about 1.5 times to 2.0 times the height T0 of the ceramic element body 4 in the Z-axis direction.

On the other hand, the coating layer 9 that is an alloy layer containing copper and tin is not formed on the lead leg portion 8d and the lower side 8c2 of the bent portion 8c. A tin plating layer instead of the alloy layer containing copper and tin is formed on the lead leg portion 8d and the lower side 8c2 of the bent portion 8c. This tin plating layer preferably contains tin in an amount of 90 mol % or more, and a thickness of the tin plating layer is preferably about 1 μm to 10 μm. Since the tin plating layer is formed on the lead leg portion 8d that serves as the board mounting portion, the joining reliability between the board and the lead terminal 8 tends to be improved.

The thickness of the coating layer 9 and the tin plating layer is measured by observing the X-Z cross section shown in FIG. 4 with a scanning electron microscope (SEM). In addition, components of the coating layer 9 or the tin plating layer are measured by performing energy dispersive X-ray analysis (EDX) during SEM observation. During SEM-EDX, it is preferable to carry out element analysis by point analysis (elemental quantitative analysis) and mapping by area analysis in combination. Furthermore, in order to perform more detailed compound identification of the coating layer 9, crystal structure analysis may be performed by electron diffraction using a transmission electron microscope (TEM).

Although the details will be described later, in the present embodiment, since the coating layer 9 is formed on the element joining portion 8b of the lead terminal 8, an angle θ of the fillet 10a of the solder 10 is small. The angle θ of the fillet 10a refers to an angle formed by the side surface 4b of the ceramic element body 4 and an outer edge portion 10ab1 of the fillet 10a in the X-Z cross section shown in FIG. 4.

The side surface 4b of the ceramic element body 4, on which the fillet 10a is formed, is a side surface that is substantially perpendicular to the Z axis of the ceramic element body 4, and is a side surface that is close to the board mounting side. In addition, as described above, the angle θ of the fillet 10a changes depending on a configuration of the coating layer 9 formed on the surface of the lead terminal 8, and also changes depending on surface conditions of the terminal electrode 6, the shape of the bent portion 8c, or the like.

In the present embodiment, the angle θ of the fillet 10a is preferably 15 degrees or more and less than 40 degrees, and more preferably less than 35 degrees. The angle θ of the fillet 10a is measured by taking a cross-sectional photograph of the X-Z cross section shown in FIG. 4 with the SEM or an optical microscope, and performing image analysis on the cross-sectional photograph. At this time, a sample for observation is obtained by cutting and mirror-polishing the ceramic electronic component 2 so that the X-Z cross section is at a substantially central position of the lead terminal 8 in the Y-axis direction.

Subsequently, an example of a method for manufacturing the ceramic electronic component 2 shown in FIG. 1 is described below.

First, a capacitor chip is prepared as the ceramic element body 4. The capacitor chip may be manufactured by a known method. For example, green sheets each formed with an electrode pattern are laminated by a method such as a doctor blade method or screen printing to obtain a laminated body. Then, the obtained laminated body is pressed and fired to obtain the capacitor chip.

Next, a pair of terminal electrodes 6 are formed for the prepared capacitor chip. A method of forming the terminal electrodes 6 is not particularly limited, and examples thereof include immersing the capacitor chip in a conductive paste for electrode and then performing a baking treatment. Surfaces of obtained baked electrodes may be appropriately subjected to a plating treatment. For example, each terminal electrode 6 may have a multi-layer structure of Cu baking layer/Ni plating layer/Sn plating layer.

Next, a method for manufacturing the lead terminals 8 is described. During manufacture of the lead terminals 8, first, a conductive wire 80 is prepared. In the present embodiment, as the conductive wire 80 to be prepared, it is preferable to use a Cu wire having a surface formed with a tin plating layer or a CP wire further formed with a tin plating layer on a surface of the Cu plating layer. Here, the tin plating layer formed on the surface of the Cu wire or CP wire preferably contains 90 mol % or more of tin, and preferably has a thickness of 1 μm to 10 μm.

When the coating layer 9 is formed by plating, a silver plating layer, a gold plating layer, a palladium plating layer, a copper-tin plating layer, or the like may be formed instead of the tin plating layer. Furthermore, when forming a gold plating layer or a palladium plating layer, a nickel plating layer may be formed as a base.

The prepared conductive wire 80 is cut into a predetermined length, and then bent into a U-shape as a whole. Next, the U-shaped conductive wire 80 is attached and fixed to a carrier tape. At this time, the conductive wire 80 is fixed so that both ends of the U-shape protrude from the carrier tape.

Figure 6:
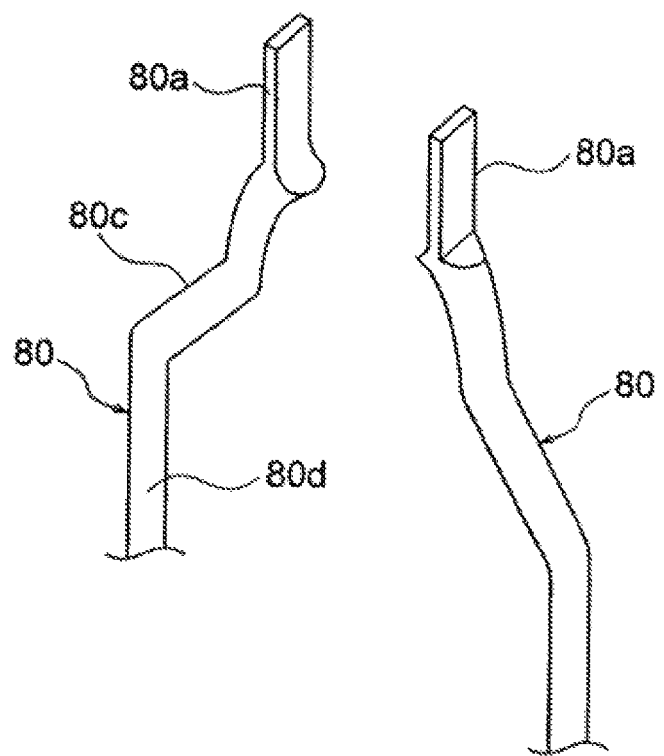
FIG. 6 is a schematic perspective view showing a tip end shape of the lead terminals.

In this way, each tip end of the conductive wire 80 is processed into a shape shown in FIG. 6 with the conductive wire 80 attached to the carrier tape. Specifically, first, both ends of the conductive wire 80 are bent to form the bent portions 80c. Then, the tip ends of the conductive wire 80 are squeezed (pressed) to form the terminal electrode facing portions 80a. In mass production, a plurality of conductive wires 80 may be attached to the carrier tape and the above-mentioned tip end processing may be performed at the same time.

Figure 5:
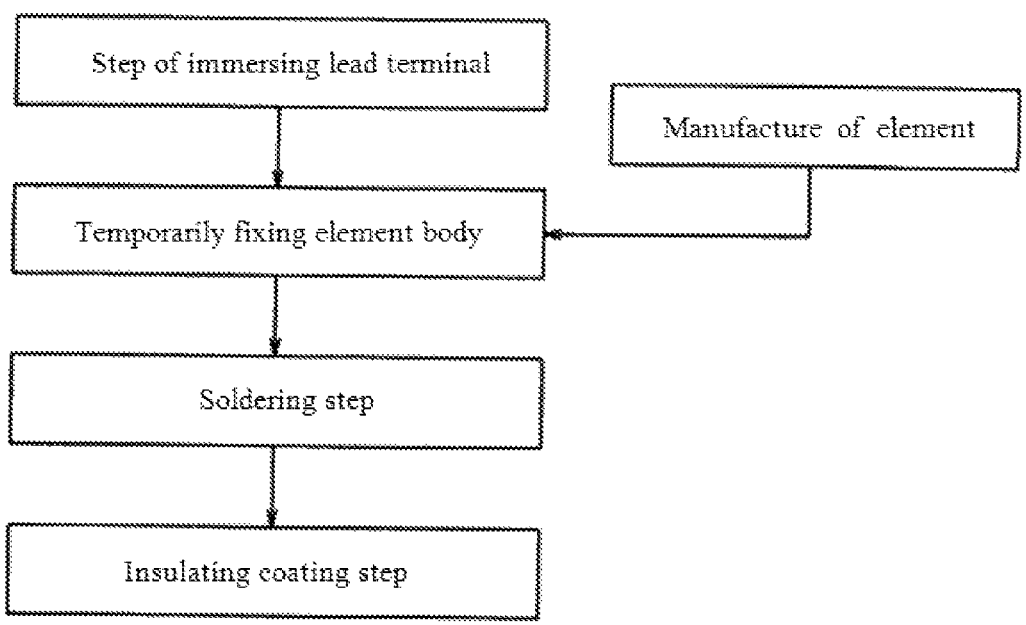
FIG. 5 is a flowchart showing manufacturing steps of the ceramic electronic component having lead terminals shown in FIG. 1.

Next, the ceramic element body 4 and the lead terminals 8 produced by the above-mentioned procedure are joined by the procedure shown in FIG. 5 to obtain the ceramic electronic component 2 with the lead terminals.

Specifically, first, only the tip end portions of the lead terminals 8 (conductive wire 80) attached to the carrier tape is immersed in the solder bath to form the coating layer 9 on the surface of the lead terminal 8 (immersing step of the lead terminals 8). At this time, the tip end portions of the lead terminals 8 immersed in the solder bath refer to portions corresponding to the element joining portions 8b (that is, the terminal electrode facing portions 8a and the upper sides 8c1 of the bent portions 8c), which is a range of the length L1 shown in FIG. 2.

In the above-mentioned immersing step, the type of the solder bath to be used may be the same as the solder bath to be used in the soldering step of the ceramic element body 4 described later, but may also be different. A temperature of the solder bath to be used varies depending on the composition of the solder, and for example, may be set to 270° C. to 320° C. in the case of tin-antimony solder. It is particularly preferable that the temperature of the solder bath in the immersing step is about 0.9 to 1.1 times a temperature of the solder bath in the soldering step described later. It is considered that by controlling the temperature of the solder bath during the immersing step as described above, a $Cu_6Sn_5$ intermetallic compound is likely to be formed on an outermost surface of the coating layer 9.

An immersing time in the solder bath in the immersing step is preferably a long time of about 10 to 60 times an immersing time in the soldering step described later, and more specifically, preferably about 10 seconds to 60 seconds. By controlling the immersing time within the above range, the thickness of the coating layer 9 can be controlled within an optimum range without thinning the tip ends of the lead terminals. In addition, it is considered that the $Cu_6Sn_5$ intermetallic compound is likely to be formed on the outermost surface side of the coating layer 9.

In the above-mentioned immersing step, at portions where the lead terminals are immersed in the solder bath (that is, portions corresponding to the element joining portions 8b), the tin plating layer formed on the surface of the conductive wire 80 is dissolved in the solder bath, and the coating layer 9 that is an alloy layer containing copper and tin is formed. At the lead leg portions 8d and the lower sides 8c2 of the bent portions 8c of the lead terminals 8 which are not immersed in the solder bath, the tin plating layer remains on the surface.

After performing the above-mentioned immersing step, the ceramic element body 4 is temporarily fixed by arranging the ceramic element body 4 between the terminal electrode facing portions 8a of the pair of lead terminals 8 and sandwiching the ceramic element body 4 by the pair of terminal electrode facing portions 8a.

Next, the tip end portions of the lead terminals 8 to which the ceramic element body 4 is temporarily fixed are immersed in the solder bath to solder the terminal electrodes 6 and the lead terminals 8 (soldering step). In this soldering step, the immersing time in the solder bath is about 0.5 seconds to 2 seconds, and particularly preferably about 0.8 seconds to 1.5 seconds. By setting the immersing time in the soldering step within the above-mentioned range, a thermal effect on the ceramic element body 4 can be suppressed to a minimum.

After the soldering step, the tip end portions of the lead terminals 8 to which the ceramic element body 4 is joined are immersed in a bath of a liquid insulating resin. At this time, at least the ceramic element body 4 and the element joining portions 8b of the lead terminals 8 are immersed in the bath of the insulating resin. Then, by appropriately applying a heat treatment depending on the type of the insulating resin to be used, the exterior 20 is formed so as to cover the ceramic element body 4 and the element joining portions 8b of the lead terminals 8.

The series of steps shown in FIG. 5 may be performed with the lead terminals 8 attached and fixed to the carrier tape. After forming the exterior 20, a connecting portion (that is, a U-shaped arc portion) of the pair of lead leg portions 8d is cut, and the lead terminals 8 are removed from the carrier tape, so that the ceramic electronic component 2 shown in FIG. 1 is obtained.

In the ceramic electronic component 2 according to the present embodiment, the fillet 10a of solder 10 is formed between the side surface 4b of the ceramic element body 4 and the lead terminal 8, and the joining areas of the solder 10 are present on both the end surface side electrode 6a and the side surface side electrode 6b of the terminal electrode 6. Therefore, in the ceramic electronic component 2, the lead terminal 8 is firmly connected to the terminal electrode 6 of the ceramic element body 4.

Particularly, in the ceramic electronic component 2 according to the present embodiment, the sufficient joining strength can be ensured even when the size of the ceramic element body is small. More specifically, regarding the dimensions of the ceramic element body 4, the length in the X-axis direction is preferably 2.0 mm or less, and the width W0 in the Y-axis direction is preferably 1.25 mm or less, and even this case can benefit from the effect of the present invention.

In addition, in the ceramic electronic component 2 according to the present embodiment, the sufficient joining strength is ensured at the joining portion between the terminal electrode 6 and the lead terminal 8, and at the same time, the occurrence of cracks inside the ceramic element body 4 can be suppressed.

In the prior art, it is common to use a Cu wire or a CP wire having a surface formed with a tin plating layer as a lead terminal, and it is also common to solder the Cu wire or the CP wire to a terminal electrode in a short time without performing a immersing step in advance. With this conventional method, the tin plating layer on the surface is dissolved on the solder bath during soldering. Therefore, with the conventional method, the coating layer 9 is not formed at the boundary between the lead terminal and the solder in the joining cross section after solidification of the solder.

Moreover, with the above-mentioned conventional method, the angle of the fillet of the solder is large. More specifically, with the conventional method, the outer edge portion of the fillet is located at reference numeral 10ab2 shown in FIG. 4, and the angle of the fillet is 40 degrees or more. In this case, cracks are likely to occur near the fillet of the ceramic element body due to shrinkage stress during the solidification of the solder. In addition, since an internal stress is accumulated in the fillet even after the solidification of the solder, when an external force is applied to the lead terminal, cracks are likely to occur near the fillet of the ceramic element body. In response to this problem, in the prior art, it has been known that in order to suppress cracks, a part of the lead terminal is subjected to a solder adhesion preventing treatment to partially deteriorate the solder wettability on the surface of the lead terminal.

Contrary to the prior art, in the ceramic electronic component 2 according to the present embodiment, the coating layer 9 is formed on the element joining portion 8b (a portion in contact with the solder 10) of the lead terminal 8 to improve the solder wettability of the surface. In the present invention, it has been found that the angle θ of the fillet 10a on the side surface 4b side of the ceramic element body 4 is rather reduced by improving the solder wettability on the lead terminal 8 side. Since the angle θ of the fillet is reduced, the occurrence of cracks near the fillet 10 of the ceramic element body 4 can be effectively suppressed. Moreover, since the cracks are suppressed, the mechanical strength of the ceramic electronic component 2 is improved.

In addition, in the ceramic electronic component 2 according to the present embodiment, the metal component forming the coating layer 9 preferably contains copper and tin. Then, it is preferable to form, at the boundary between the lead terminal 8 and the solder 10, the joining structure formed in the order of copper of the lead terminal 8, the coating layer 9 containing copper and tin, and the solder 10 along the X-axis direction from the lead terminal 8 side. By adopting the above-mentioned joining structure, the solder wettability on the lead terminal 8 side is further optimized, and the angle θ of the fillet 10a becomes smaller.

The angle θ of the fillet 10a is preferably 15 degrees or more and less than 40 degrees, and more preferably less than 35 degrees. By controlling the angle θ of the fillet 10a within the above-mentioned range, cracks generated in the ceramic element body 4 can be suppressed more preferably.

Furthermore, the thickness of the coating layer 9 is preferably 1 μm or more and 7 μm or less. By setting the thickness of the coating layer 9 within the above-mentioned range, the surface of the conductive wire 80 as the base can be sufficiently covered with the coating layer 9, and the solder wettability on the lead terminal 8 side is further optimized. As a result, cracks generated in the ceramic element body 4 can be suppressed more preferably.

It is particularly preferable that the coating layer 9 is an alloy layer that contains copper and tin and is formed by the immersing step. In the present embodiment, since the coating layer 9 is an alloy layer formed by the immersing step, the mechanical strength tends to be improved as compared with the copper-tin plating layer formed by the plating. A reason why the mechanical strength is improved is unclear yet, but is considered as due to differences in minute crystal structure between the copper-tin alloy layer formed by the immersing step and the copper-tin plating layer.

The coating layer 9 formed by the immersing step of the present embodiment may contain $Cu_3Sn$ and $Cu_6Sn_5$, but it is considered that in a case of immersing step, more $Cu_6Sn_5$ is (selectively) present on the outermost surface side (that is, the solder 10 side of the coating layer 9). It is considered that $Cu_6Sn_5$ particularly contributes to the improvement of the solder wettability than other intermetallic compounds. And in the present embodiment, it is considered that since a large amount of $Cu_6Sn_5$ is present on the outermost surface side of the coating layer 9, the crack suppressing effect is further improved, and the mechanical strength of the ceramic electronic component 2 is improved.

However, as described above, the thickness of the coating layer 9 is as thin as several μm (about 0.5 to 10 μm), and it is not always easy to specify the fine crystal structure of the coating layer 9 in detail. Therefore, the crystal structure (in particular, the distribution of the intermetallic compounds) of the coating layer 9 and the reason why the mechanical strength is improved as described above are merely an inference, and the principle of providing effects is not limited to the above-mentioned contents.

When the coating layer 9 contains $Cu_6Sn_5$, in addition to the above-described effects, improvement of the heat resistance at the joining portion between the lead terminal 8 and the solder 10 also can be expected. This is because $Cu_6Sn_5$ has a higher melting point than tin.

Moreover, in the present embodiment, the ratio of L1 to T0 (L1/T0) is preferably 1.5 to 2.0 times, where T0 is the height of the ceramic element body 4 in the Z-axis direction and L1 is the length of a portion of the lead terminal 8 where the coating layer 9 is formed (the element joining portion 8b). The tin plating layer is preferably formed on the surface of a portion of the lead terminal 8 where the coating layer 9 is not formed (the lower side 8c2 of the bent portion 8c and the lead leg portion 8d).

In this way, since different coating layers are formed on the tip end side (the terminal electrode facing portion 8a side) and the board mounting side (the lead leg portion 8d side) of the lead terminal 8, the joining reliability on the terminal electrode facing portion side can be ensured, and the joining reliability on the board mounting side also can be ensured.

Although the embodiment of the present invention has been described above, the present invention is not limited to the above-described embodiment, and various modifications can be made within the scope of the present invention. For example, in the above-described embodiment, the case where the ceramic element body 4 is a laminated ceramic capacitor has been described, but the ceramic electronic component may be a varistor, a piezoelectric element, a filter, a chip bead, an inductor, a thermistor, or the like other than the capacitor. In a case of these electronic components, the ceramic layer 14 only has to be made of piezoelectric ceramic, semiconductor ceramic, magnetic ceramic, or the like.

In addition, in the above-described embodiment, a lead wire whose tip end is squeezed is disclosed as the lead terminal 8, but the lead terminal 8 may be a terminal having a circular cross section in all parts without being squeezed, or a terminal formed by processing a metal plate. Furthermore, the tip end portion of the lead terminal 8 (terminal electrode facing portion 8a) may have a semicircular cross-sectional shape.

EXAMPLES

Hereinafter, the present invention is described based on further detailed examples, however, the present invention is not limited to the following examples.

Example 1

First, a chip of a laminated ceramic capacitor was prepared as the ceramic element body 4. Dimensions of the capacitor chip were 1.6 mm in length×0.8 mm in width×0.8 mm in height. In addition, the pair of terminal electrodes 6 were formed on the capacitor chip by baking a Cu paste. The surface of each terminal electrode 6 was plated with nickel and tin, and the thickness of each terminal electrode was controlled at 6 to 10 μm to 60 μm.

Next, a Cu wire having a surface formed with a tin plating layer was prepared as a material forming the lead terminals 8. The thickness of the tin plating layer on the surface of the Cu wire was 5 μm on average. The prepared Cu wire was cut into a predetermined length, bent into a U shape, and then fixed to a carrier tape.

Next, the Cu wire fixed to the carrier tape was bent and squeezed to form a tip end shape as shown in FIG. 6. Then, only the tip end portions of the Cu wire were immersed in the solder bath in the state fixed to the carrier tape. At this time, regarding the solder bath, an Sn90-Sb10 solder material was used, and as the immersion conditions, the temperature of the solder bath was set to 290° C. and the immersing time in the solder bath was set to 60 seconds. In addition, the length of the Cu wire immersed in the solder bath was controlled so that L1/T0 was 1.75.

After the above-mentioned immersing step, the capacitor chip formed with the terminal electrodes 6 was temporarily fixed to the tip end portions of the Cu wire (that is, the terminal electrode facing portions 8a). Then, the tip end portions of the Cu wire to which the capacitor chip was temporarily fixed was immersed in the solder bath at 290° C. for about 1 second to solder the Cu wire (the lead terminals 8) and the capacitor chip. At this time, as the solder bath, the same Sn90-Sb10 solder material was used as in the immersing step.

After soldering, the pair of lead leg portions 8d of the lead terminals 8 were cut, and the lead terminals 8 were removed from the carrier tape to obtain the ceramic electronic component 2 having the lead terminals. In the above-mentioned steps, at least 30 electronic component samples were manufactured and evaluated as follows.

(Observation of Coating Layers 9)

Each coating layer 9 included in the obtained electronic component sample was confirmed by SEM observation. Specifically, the boundary between each lead terminal 8 and the solder 10 was analyzed by SEM-EDX, the presence or absence of the coating layer 9 was analyzed, and the qualitative analysis of the elements contained in the coating layer 9 were performed. The thickness of the coating layer 9 was measured by taking a cross-sectional photograph in the X-Z cross section and performing image analysis on the cross-sectional photograph. At this time, the sample for observation was obtained by cutting and mirror-polishing the ceramic electronic component 2 so that the X-Z cross section is at a substantially central position of the lead terminal 8 in the Y-axis direction.

(Measurement of Angle θ of Fillet 10a)

During the above-mentioned SEM observation, the angle θ of the fillet 10a present between each side surface 4b and each lead terminal was measured. The measurement was performed by image analysis of the SEM cross-section photograph. The measurement results are shown in Table 1. The angle θ of the fillet 10a shown in Table 1 is an average value, and the average value was calculated by measuring 20 electronic component samples at two portions each (that is, measuring at a total of 40 portions).

(Crack Evaluation)

In addition, during the above-mentioned SEM observation, it was examined whether or not cracks are present inside the ceramic element body 4 (in particular, near the fillet 10a of the ceramic element body 4). The crack examination was performed at two portions for each of the 20 electronic component samples (that is, a total of 40 portions were examined), and a rate at which cracks occurred was calculated as the crack occurrence rate. In addition, regarding each sample in which the cracks were generated, a length of each crack was measured and the average value was calculated. The results of the crack evaluation are shown in Table 1.

(Leg Split Strength Test)

The mechanical strength of the ceramic electronic component 2 was also evaluated by conducting a leg split strength test. In the leg split strength test, the end portions on the lead leg portion 8d sides of the pair of lead terminals 8 were pulled in directions away from each other in the X-axis direction, and a tension was applied until the electronic component sample was broken. Then, the tension at the time when the electronic component sample was broken was measured as the leg spilt strength. The test was performed on 10 samples, and the average value was calculated.

In the leg spilt strength test, if a crack occurs inside the ceramic element body 4, the leg spilt strength decreases. In addition, if the joining strength between each lead terminal 8 and each terminal electrode 6 is not sufficiently ensured, the leg spilt strength decreases. Therefore, in this example, it is determined that the higher the numerical value of the leg spilt strength, the higher the mechanical strength of the ceramic electronic component 2. The evaluation results are shown in Table 1.

Example 2

In Example 2, a CP wire having a surface formed with a tin plating layer was used as the conductive wire 80 constituting the lead terminals 8. The thickness of the tin plating layer on the surface of the CP wire was 5 μm on average. The electronic component samples according to Example 2 were produced with other experimental conditions being the same as in Example 1. The evaluation results of Example 2 are shown in Table 1.

Comparative Example 1

In Comparative Example 1, as in Example 1, a Cu wire having a surface formed with a tin plating layer was used as the conductive wire 80 constituting the lead terminals 8. However, in Comparative Example 1, each lead terminal was soldered to the ceramic element body without performing the immersing step. The electronic component samples according to Comparative Example 1 were produced with other experimental conditions being the same as in Example 1. The evaluation results are shown in Table 1.

Comparative Example 2

In Comparative Example 2, as in Example 2, a CP wire formed with a tin plating layer on the outermost surface was used as the conductive wire 80 constituting the lead terminals 8. However, in Comparative Example 2, each lead terminal was soldered to the ceramic element body without performing the immersing step. The electronic component samples according to Comparative Example 2 were produced with other experimental conditions being the same as in Example 2. The evaluation results are shown in Table 1.

analyzed by SEM-EDX that $Cu_6Sn_5$ was contained in the coating layer 9 after the soldering. In Example 2, in a state after soldering, the thickness of the coating layer 9 is as thin as 1.0 μm or less depending on the thickness of the Cu plating layer of the CP wire, and it was difficult to identify the compound contained in the coating layer 9.

In Examples 1 and 2, it was confirmed that since the coating layer 9 was formed on the surface of the lead terminal 8 via the immersing step, the angle θ of the fillet 10a was smaller than that in Comparative Examples 1 and 2. As a result, in Example 1, it was confirmed that the crack occurence rate was reduced to ½ or less of that in Comparative Example 1. In addition, in Example 1, even if a crack was generated, the crack length was as short as ¼ or less of that in Comparative Example 1.

The same applies to Example 2, in Example 2, it was confirmed that the crack occurrence rate was reduced to ⅓ or less of that in Comparative Example 2. In addition, in Example 2, even if a crack was generated, the crack length was as short as ½ or less of that in Comparative Example 2.

From the above-mentioned results, it was confirmed that by forming the coating layer 9 on the surface of the lead terminal 8 by the immersing step to improve the solder wettability on the lead terminal 8 side, the angle θ of the fillet 10a on the ceramic element body side becomes small, and the occurrence of the cracks could be suppressed.

Furthermore, comparing Example 1 with Comparative Example 1 and comparing Example 2 with Comparative Example 2, it can be confirmed that the leg spilt strength in each example is higher than that each comparative example. It can be seen that the improvement rate of the leg spilt strength is high especially when the CP wire is used (when comparing Example 2 and Comparative Example 2). From

TABLE 1

| Sample no. | Configuration of lead terminal | | | | Configuration of coating layer | | Angle θ of fillet on element side | Crack evaluation for element | | Leg split strength test Leg split |
|---|---|---|---|---|---|---|---|---|---|---|
| | | Plating layer | | | | | surface side | Occurrence | | strength |
| | Used wire | First layer | Second layer | Immersing treatment | Component | Thickness (μm) | degree (average) | rate % | Length μm | (average) N |
| Comparative Example 1 | Cu wire | Sn | — | No | — | — | 54.6 | 45 | 99.2 | 2.6 |
| Comparative Example 2 | CP wire | Cu | Sn | No | — | — | 43.5 | 60 | 205.7 | 1.3 |
| Example 1 | Cu wire | Sn | — | Yes | Containing copper and tin | 1 to 7 μm | 36.4 | 17.5 | 24.2 | 2.8 |
| Example 2 | CP wire | Cu | Sn | Yes | Containing copper and tin | 1 μm or less | 33.0 | 20 | 109.0 | 2.0 |

As shown in Table 1, in Comparative Examples 1 and 2 in which the immersing step was not performed, the presence of the coating layer could not be confirmed at the boundary between the lead terminal 8 and the solder 10 after the joining (after the solder solidification). In Comparative Examples 1 and 2, it was confirmed that the angle θ of the fillet 10a was 40 degrees or more. In Comparative Examples 1 and 2, since the angle θ of the fillet 10a is large, the crack occurrence rate is high and the crack length is long.

On the other hand, in Examples 1 and 2 in which the immersing step was performed, it was confirmed that the coating layer 9 containing copper and tin was formed on the surface of the lead terminal 8. In particular, in Example 1, it was confirmed from the content ratio of copper and tin these results, it was confirmed that the mechanical strength of the obtained ceramic electronic component 2 was improved by forming the coating layer 9 on the surface of the lead terminal 8 by the immersing step.

Examples 11 to 15

In Examples 11 to 15, as in Example 1, a Cu wire having a surface formed with a tin plating layer was used as the conductive wire 80 to manufacture electronic component samples. However, the immersing time of the immersing step was changed in the range of 10 seconds to 60 seconds in Examples 11 to 13, and the immersing time was set to 10 seconds in Example 11, 30 seconds in Example 12, and 60 seconds in Example 13. In addition, the temperature of the solder bath during the immersing step was changed in Examples 14 and 15, where the temperature of the solder bath was set to 270° C. in Example 14, and 320° C. in Example 15. Detailed conditions of each example are shown in Table 2A. The experimental conditions other than those described above in Examples 11 to 15 are the same as in Example 1.

Examples 21 to 25

In Examples 21 to 25, as in Example 2, a CP wire having a surface formed with a tin plating layer was used as the conductive wire 80 to manufacture the electronic component samples. As in Examples 11 to 15, the experiments were conducted by changing the conditions during the immersing step in Examples 21 to 25. Detailed conditions of each example are shown in Table 2B. The experimental conditions other than those in the immersing step in Examples 21 to 25 are the same as in Example 2.

the coating layer 9 of the lead terminal 8 is correspondingly increased. From this result, it was confirmed that the thickness of the coating layer can be controlled by the length of the immersing time or the temperature of the solder bath during the immersing step.

Comparing the examples shown in Table 2A, it could be confirmed that the crack occurrence rate is lower in the examples other than Example 13 (11, 12, 14, 15) in which the angle θ of the fillet is less than 35 degrees than that in Example 13 in which the angle θ of the fillet is 35 degrees or more.

Next, the relation between the conditions of the immersing step (immersing time, the temperature of the solder bath) and the leg spilt strength characteristics will be considered based on Table 2B. As shown in Table 2B, when the immersing time was varied (when comparing Examples 21 to 23), Example 23 in which the immersing time is long had the highest leg spilt strength. It is presumed that the immersing time in the solder bath in the immersing step affects the

TABLE 2A

| | | Immersing step | | Soldering step | | | Configuration of coating layer | | Crack evaluation for element | |
|---|---|---|---|---|---|---|---|---|---|---|
| Sample No. | Used wire | Temperature of solder bath °C. | Immersing time sec | Temperature of solder bath °C. | Immersing time sec | Component | Thickness μm | Angle θ of fillet on element side surface side degree | Occurrence rate % | Length μm |
| Example 11 | Cu wire | 290 | 10 | 290 | 1 | Containing copper and tin | about 1 | 34.0 | 5 | 92.0 |
| Example 12 | Cu wire | 290 | 30 | 290 | 1 | Containing copper and tin | 2 to 3 | 31.8 | 5 | 83.5 |
| Example 13 | Cu wire | 290 | 60 | 290 | 1 | Containing copper and tin | 1 to 7 | 36.4 | 17.5 | 24.2 |
| Example 14 | Cu wire | 270 | 30 | 290 | 1 | Containing copper and tin | About 1.5 | 33.1 | 5 | 93.8 |
| Example 15 | Cu wire | 320 | 30 | 290 | 1 | Containing copper and tin | About 3 | 30.0 | 5 | 103.3 |

TABLE 2B

| | | Immersing step | | Soldering step | | Leg split strength test | |
|---|---|---|---|---|---|---|---|
| Sample No. | Used wire | Temperature of solder bath °C. | Immersing time sec | Temperature of solder bath °C. | Immersing time sec | Leg split strength (average) N | Comparing with Comparative Example 2 times |
| Example 21 | Cu wire | 290 | 10 | 290 | 1 | 1.8 | 1.38 |
| Example 22 | Cu wire | 290 | 30 | 290 | 1 | 1.7 | 1.31 |
| Example 23 | Cu wire | 290 | 60 | 290 | 1 | 2.0 | 1.54 |
| Example 24 | Cu wire | 270 | 30 | 290 | 1 | 1.9 | 1.46 |
| Example 25 | Cu wire | 320 | 30 | 290 | 1 | 1.5 | 1.15 |

As shown in Table 2A, comparing the results of Examples 11 to 13, it can be seen that the thickness of the coating layer 9 of the lead terminal 8 is increased by increasing the immersion time. In addition, comparing Examples 12, 14, and 15, it can be seen that when the temperature of the solder bath during the immersing step is increased, the thickness of crystal growth of $C_6Sn_5$ contained in the coating layer 9, and it is considered that the growth degree of $C_6Sn_5$ affects the strength characteristics of the ceramic electronic component.

In addition, as shown in Table 2B, when the temperature of the solder bath in the immersing step was changed (when comparing Examples 24 and 25), Example 24 in which the temperature of the solder bath is lower had a higher leg spilt strength than that in Example 25. It is presumed that when the temperature of the solder bath is low in the immersing step, the generation of Cu3Sn is suppressed and the proportion of $Cu_6Sn_5$ becomes high. Further, it is considered that the proportion of $Cu_6Sn_5$ in the coating layer 9 affects the strength characteristics of the ceramic electronic component.

As shown in Table 2B, it was confirmed that each of the leg spilt strengths of Examples 21 to 25 was higher than the leg spilt strength of Comparative Example 2. In particular, in Examples 23 and 24, the leg spilt strengths were about 1.5 times that of Comparative Example 2.

REFERENCE SIGNS LIST 2 ceramic electronic component
4 ceramic element body
4a end surface
4b side surface
6 terminal electrode
6a end surface side electrode
6b side surface side electrode
8 lead terminal
8a terminal electrode facing portion
8b element joining portion
8c bent portion
8c1 upper side of the bent portion
8c2 lower side of the bent portion (kink)
8d lead leg portion (board mounting portion)
9 coating layer
10 solder
10a vfillet
10ab1, 10ab2 outer edge portion of the fillet
20 exterior
80 conductive wire

What is claimed is:

1. A ceramic electronic component, comprising:
a ceramic element body;
a terminal electrode formed on from an end surface to a side surface of the ceramic element body; and
a lead terminal joined to the terminal electrode by a solder, wherein
a fillet of the solder is formed between the terminal electrode of the side surface at the ceramic element body and the lead terminal,
a coating layer is formed on a surface of the lead terminal that is in contact with the solder, and
the coating layer is formed of a metal component having a contact angle with the solder smaller than that of the lead terminal.

2. The ceramic electronic component according to claim 1, wherein
the lead terminal contains copper.

3. The ceramic electronic component according to claim 1, wherein
the metal component forming the coating layer contains tin and copper.

4. The ceramic electronic component according to claim 3, wherein
a boundary between the lead terminal and the solder has a joining structure formed in an order of copper of the lead terminal, the coating layer, and the solder.

5. The ceramic electronic component according to claim 3, wherein
the coating layer contains $Cu_6Sn_5$.

6. The ceramic electronic component according to claim 1, wherein
the coating layer has an alloy layer formed by immersing only a tip end portion of the lead terminal in a solder bath.

7. The ceramic electronic component according to claim 1, wherein
an angle of the fillet with respect to the side surface of the ceramic element body is 15 degrees or more and less than 40 degrees.

8. The ceramic electronic component according to claim 7, wherein
the angle of the fillet is less than 35 degrees.

9. The ceramic electronic component according to claim 1, wherein
a thickness of the coating layer is 1 μm or more and 7 μm or less.

10. The ceramic electronic component according to claim 1, wherein
a ratio of L1 to T0 (L1/T0) is 1.5 to 2.0 times, where
T0 is a length of the ceramic body in a first direction
L1 is a length of a portion of the lead terminal in the first direction on which the coating layer is formed, and
the first direction is a longitudinal direction of the lead terminal, and
a tin plating layer is formed on a surface of the lead terminal on which the coating layer is not formed.

* * * * *